(12) United States Patent
Lawyer

(10) Patent No.: US 11,782,995 B2
(45) Date of Patent: *Oct. 10, 2023

(54) COMPUTER-IMPLEMENTED METHOD AND APPARATUS FOR DETERMINING A RELEVANCE OF A NODE IN A NETWORK

(71) Applicant: Max-Planck-Gesellschaft zur Förderung der Wissenschaften e.V., Munich (DE)

(72) Inventor: Glenn Lawyer, Luxembourg (LU)

(73) Assignee: Max-Planck-Gesellschaft zur Förderung der Wissenschaften e.V., Munich (DE)

(*) Notice: Subject to any disclaimer, the term of this patent is extended or adjusted under 35 U.S.C. 154(b) by 437 days.

This patent is subject to a terminal disclaimer.

(21) Appl. No.: 16/790,652

(22) Filed: Feb. 13, 2020

(65) Prior Publication Data
US 2020/0250250 A1    Aug. 6, 2020

Related U.S. Application Data

(63) Continuation-in-part of application No. 14/610,430, filed on Jan. 30, 2015, now Pat. No. 10,579,684.
(Continued)

(30) Foreign Application Priority Data

Jan. 31, 2014 (EP) .................... 14153465

(51) Int. Cl.
*G06F 16/9536* (2019.01)
*G06F 16/2457* (2019.01)
(Continued)

(52) U.S. Cl.
CPC .... *G06F 16/9536* (2019.01); *G06F 16/24578* (2019.01); *G06F 16/951* (2019.01); *G06F 16/9535* (2019.01); *G06Q 50/01* (2013.01)

(58) Field of Classification Search
CPC .......... G06F 16/24578; G06F 16/9024; G06F 16/951; G06F 16/9535; G06F 16/9536; G06Q 50/01
(Continued)

(56) References Cited

U.S. PATENT DOCUMENTS 5,153,922 A * 10/1992 Goodridge .............. G10L 21/06
  704/219
6,738,678 B1  5/2004 Bharat et al.
(Continued)

OTHER PUBLICATIONS

Canright G S et al, "Epidemic spreading over networks—A view from neighbourhoods", Telektronikk, Telenor AS, Norway, (Sep. 30, 2005), vol. 101, No. 2005, ISSN 0085-7130, pp. 65-86, XP002403245.
(Continued)

*Primary Examiner* — Phong H Nguyen
(74) *Attorney, Agent, or Firm* — Siritzky Law, PLLC

(57) ABSTRACT

A computer-implemented method for determining a relevance or rating score of a particular user in an electronic social network includes obtaining a digital representation of a local connection structure of the particular user in the network in a computer-readable non-volatile memory; determining a numerical value characteristic of the particular user's relevance; and outputting the numerical value. The numerical value is determined based on the connection structure of the particular user, and on degrees of all sets of users in the social network reachable from the particular user using at most k connections, where k is a fixed preset positive integer number, and based on a degree determined
(Continued)

for each enumerated set, and where the degree of a set is determined as a number of connections connecting users inside the set to users outside.

15 Claims, 10 Drawing Sheets

Related U.S. Application Data

(60) Provisional application No. 61/933,938, filed on Jan. 31, 2014.

(51) Int. Cl.
*G06Q 50/00* (2012.01)
*G06F 16/951* (2019.01)
*G06F 16/9535* (2019.01)

(58) Field of Classification Search
USPC .................... 707/722, 728, 749, 798, 748
See application file for complete search history.

(56) References Cited

U.S. PATENT DOCUMENTS

| | | | | |
|---|---|---|---|---|
| 7,681,131 | B1* | 3/2010 | Quarterman | H04L 41/22 709/224 |
| 8,311,950 | B1* | 11/2012 | Kunal | H04L 67/535 705/319 |
| 8,521,782 | B2* | 8/2013 | Gong | G06F 9/5066 707/791 |
| 9,407,719 | B2* | 8/2016 | van de Bruggen | G06Q 50/01 |
| 9,524,316 | B2* | 12/2016 | Floreskul | G06Q 50/01 |
| 9,560,065 | B2* | 1/2017 | Neil | H04L 1/002 |
| 2004/0114539 | A1* | 6/2004 | Beshai | H04L 49/357 370/254 |
| 2004/0249824 | A1* | 12/2004 | Brockway | G06F 16/81 707/999.1 |
| 2007/0297374 | A1* | 12/2007 | El-Damhougy | H04W 40/24 370/338 |
| 2011/0218960 | A1* | 9/2011 | Hatami-Hanza | G06F 16/9535 707/603 |
| 2013/0339358 | A1* | 12/2013 | Huibers | H04L 51/52 707/737 |
| 2014/0188994 | A1* | 7/2014 | Patterson | H04L 9/40 709/204 |
| 2014/0214946 | A1* | 7/2014 | van de Bruggen | G06Q 10/105 709/204 |
| 2015/0020199 | A1* | 1/2015 | Neil | H04L 63/1408 726/23 |
| 2015/0074122 | A1* | 3/2015 | Appel | G06F 16/9535 707/749 |

OTHER PUBLICATIONS

Ghoshal, Gourab; Barabasi, Albert Laszlo: "Ranking stability and super-stable nodes in complex networks", Nat Commun, vol. 2, 2011, p. 394.

Leandros A Maglaras et al, "New Metrics for Characterizing the Significance of Nodes in Wireless Networks via Path-Based Neighborhood Analysis", Informatics, 2009. PCI 09. 13th Panhellenic Conference on, IEEE, Piscataway, NJ, USA, (Sep. 10, 2009), ISBN 978-0-7695-3788-7, pp. 143-147, XP031552131.

Sen Pei et al, "Spreading dynamics in complex networks", Journal of Statistical Mechanics: Theory and Experiment, Institute of Physics Publishing, Bristol, GB, vol. 2013, No. 12, doi:10.1088/1742-5468/2013/12/P12002, ISSN 1742-5468.

Marco Bressanenoch Peserico, "Choose the damping, choose the ranking", Journal of Discrete Algorithms, (20100000), vol. 8, pp. 199-213.

Pasquale De Meo et al, "A novel measure of edge centrality in social networks", Knowledge-Based Systems, Elsevier, Amsterdam, NL, vol. 30, doi:10.1016/J.KNOSYS.2012.01.007, ISSN 0950-7051, (Jan. 6, 2012), pp. 136-150, (Jan. 15, 2012), XP028472112.

Pei, S., Muchnik, L., Andrade, Jr., J. et al. Searching for superspreaders of information in real-world social media. Sci Rep 4, 5547 (2014). https://doi.org/10.1038/srep05547.

Son, S-W.; Christensen, C.; Grassberger, P.; Paczuski, M.: "PageRank and rank-reversal dependence on the damping factor", Phys Rev E Stat Nonlin Soft Matter Phys, vol. 86, 2012, pp. 066104.

EPO, European search opinion, in EP2805957 (Application No. 20209566.7), dated Mar. 5, 2021.

Lawyer, G. Understanding the influence of all nodes in a network. Sci Rep 5, 8665 (Mar. 2015). https://doi.org/10.1038/srep08665.

EPO, European Search Report, in EP2805957 (Application No. 20209566.7), dated Mar. 5, 2021.

EPO, Amended claims filed after receipt of (European) search report in EP2805957 (Application No. 20209566.7), dated Oct. 14, 2021.

EPO, Communication regarding the transmission of the European search report, in EP2805957 (Application No. 20209566.7) dated Mar. 5, 2021.

USPTO, Non-Final Rejection, dated Apr. 25, 2019 in U.S. Appl. No. 14/610,430 [17 pgs.].

USPTO, Advisory Action, dated Nov. 13, 2018 in U.S. Appl. No. 14/610,430 [3 pgs.].

USPTO, Non-Final Rejection, dated Jul. 12, 2017 in U.S. Appl. No. 14/610,430 [20 pgs.].

USPTO, Final Rejection, dated May 8, 2018 in U.S. Appl. No. 14/610,430 [16 pgs ].

USPTO, Notice of Allowance with Reasons for Allowance, dated Oct. 22, 2019 in U.S. Appl. No. 14/610,430.

\* cited by examiner

COMPUTER-IMPLEMENTED METHOD AND APPARATUS FOR DETERMINING A RELEVANCE OF A NODE IN A NETWORK

CROSS REFERENCE TO RELATED APPLICATIONS

This application is a continuation-in-part (CIP) of U.S. application Ser. No. 14/610,430 filed 30 Jan. 2015, which claims priority from: (1) U.S. Provisional Patent Application No. 61/933,938, filed Jan. 31, 2014; and (2) European Patent Application No. EP 14 153 465.1, filed Jan. 31, 2014, the entire contents of all of which are hereby fully incorporated herein by reference for all purposes.

News and rumors spreading on social media, the spread of political opinions, the uptake of business and social innovations, the impact of disease outbreaks—society is increasingly characterized by diffusive/epidemic processes on network, and the infrastructure networks which enable such communication are also of increasing importance. However, one cannot easily or reliably measure the relevance of individual network nodes to these processes. The larger the network is, and many of today's networks comprise more than >1 billion nodes, the more important and the more difficult this task becomes.

The current state of the art is limited to measures designed to identify the most highly influential network nodes, the so-called centrality indicators such as degree, eigenvalue centrality, or k-shell. For example Google uses the Page Rank centrality to identify the most relevant web page for a given search term. But such measures are strongly limited in that they are only informative for the top $\frac{1}{10}$th of 1 percent of nodes and in that they only rank, but do not quantify, node relevance and their accuracy depends on the topology of the network, how this topology is sampled, and the type of diffusive process.

It is therefore an object of the invention to provide an automatic method for determining a network node's individual relevance that is easy to determine and correlates strongly with a node's actual relevance in the above sense. It is a further object of the invention to apply the method in the context of network monitoring, search and control.

These objects are achieved by the computer-implemented methods and a device according to the independent claims. Advantageous embodiments. are defined in the dependent claims.

The relevance or expected force (ExF) of a node in a network determined by the invention measures the contribution of a node to overall network flows. As the relevance is estimated based on a local neighborhood structure, i.e. the nodes and edges in the neighborhood of the node, it can be determined very efficiently.

Alternatively, the relevance of a node can also be characterized in terms of outcomes of a spreading process starting from that node. An outcome of a spreading process may be determined as a set of network nodes infected by the spreading process, i.e. a set of nodes reachable from the node of interest using k edges (transmission clusters of size k), where k is a fixed preset number.

The estimation of the relevance may further be based on the number of edges of the network connecting a node infected by the spreading process and a non-infected node, i.e. the numerical value may be based on the degree of each cluster in the above described enumeration. The estimation may further be based on individual weights assigned to the edges. The spreading process may comprise two or three transmission events, i.e. k may be equal to 2 or 3.

The distribution of cluster degree values may be summarized by their entropy, i.e. the, eventually normalized number of edges may be combined with its logarithm. The estimate may be combined or scaled by the logarithm of twice the node's degree or some other constant factor.

The invention also comprises a method for modifying a network or at least a representation of a network, comprising the steps of obtaining a computer-readable representation of the network; determining a relevance of one or several nodes of the network; and modifying the network, based on the determined relevance.

The invention also comprises a network, comprising nodes and connections, wherein at least one node is adapted to determine its own relevance according to the above-described methods.

A network according to the invention may be an electricity grid, a mobile phone network, a telecom and internet routing network, a public wireless network, a road-transportation network or the like, or computer-readable representations of networks, like a social graph of an online communications network.

As the inventors found when applying the inventive method to real-world test cases, the determined numerical value strongly correlates with a node's importance, while it does not involve complex computations. A specific diffusion process (i.e. for different diseases) does not need to be specified. The outcome of the diffusion process is not important; the advantage is that importance of each single node may be quantified. A ranking method building according to an embodiment of the invention on this ability provides a way to identify those nodes or elements of a technical structure that are most important in view of diffusion processes or have no importance at all. Queries on the overall influence of an individual node can be answered in real-time, due to the simplicity of the determination.

The invention's dependence only on local topology is an invaluable asset. In the above cases, the actual underlying network is only known through incomplete and biased observation. Close observation can improve the accuracy of the network representation, but such observation is costly and must be rationed. The invention allows firstly better prioritization of such resources, and further, since closer observation is expected to give a more accurate picture of the section of the network investigated better estimates of the true importance of the nodes investigated.

The measure is more accurate and more stable than any existing measure. Comparisons were made to the eigenvalue centrality, the k-shell, and the accessibility, representing both the known and the cutting edge state of the art metrics. Accuracy is measured in terms of linear correlation between the metric and the outcome of a spreading process, and is assessed for three types of spreading processes in continuous and discrete time over five families of random networks and twenty four real world networks. The expected force has correlations exceeding 0.85 in almost all cases, outperforming the other measures by a wide and statistically significant margin. Stability is observed in that the variation/standard error for the expected force is smaller than for the other measures, and that the correlations are equally strong regardless of the structure of the network. For the remaining measures, their performance varies based on network structure and the type of epidemic process simulated.

In addition to high predictive accuracy, the expected force is rapidly computable. Benchmarking tests suggest that computational times are near linear in the number of nodes when run on a single processor. More importantly, since the expected force relies only on local information, it can be computed in a massively parallel fashion, and is robust against incomplete sub sampling of the network.

Finally, as the expected force again relies only on local topology, it is suitable for dynamic and/or unknown networks.

The eigenvalue centrality is known to be highly unstable to network perturbations, as is the k-shell. As path counting metrics are expressed in terms of the adjacency matrix, they cannot be computed when the adjacency matrix is not fully specified. As no real-world network is fully known or specified, their practical value is emitted.

BRIEF DESCRIPTION OF THE FIGURES

These and further aspects of the invention are described in more detail in the following description of various embodiments, in connection with the drawing, in which.

DETAILED DESCRIPTION OF EMBODIMENTS OF THE INVENTION

Figure 1:
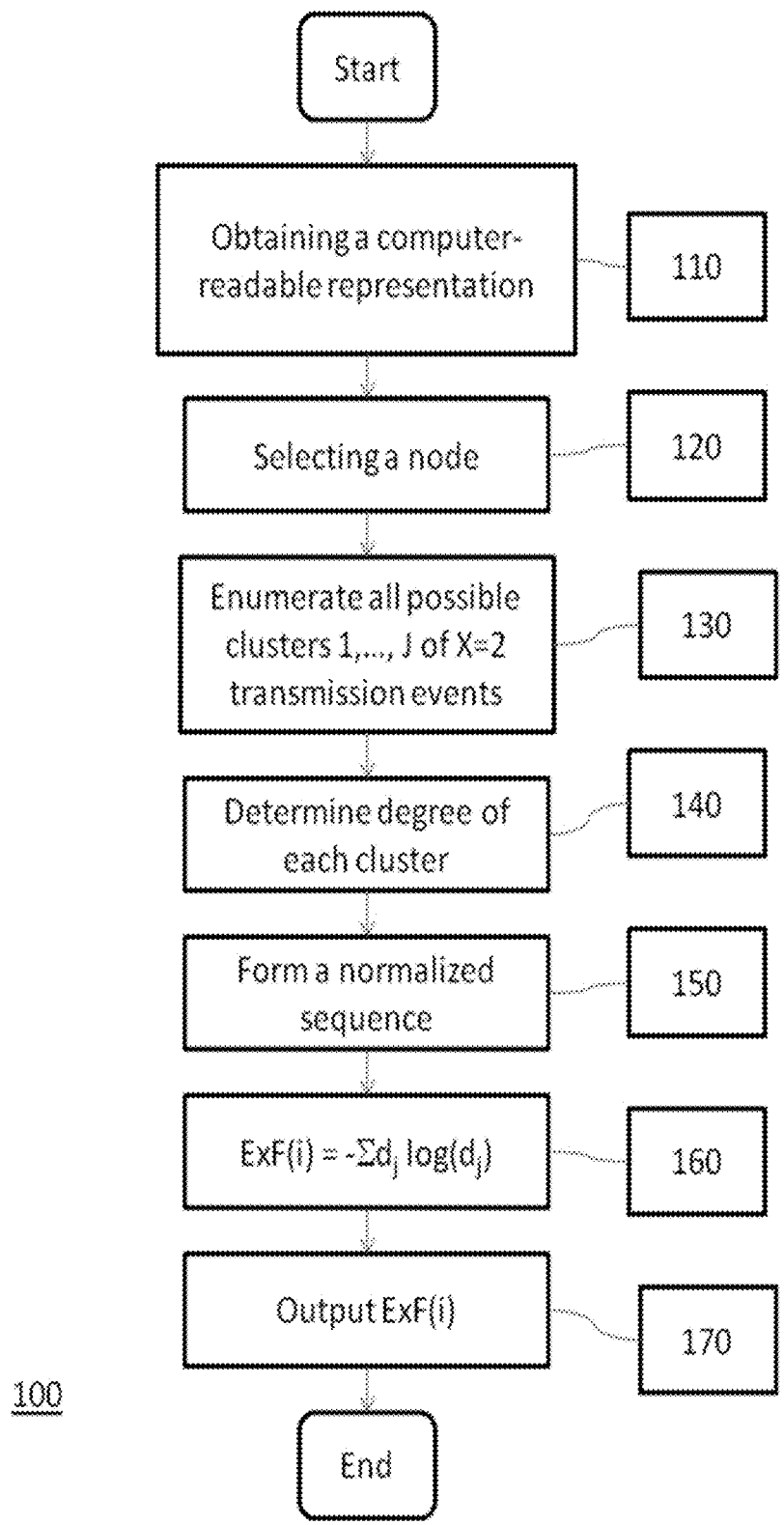
FIG. 1 shows a schematic flowchart 100 of a method for determining the relevance of node in a network according to an embodiment of the invention.

FIG. 1 shows a schematic flowchart 100 of a method for determining the relevance of node in a network according to an embodiment of the invention.

In step 110, a computer-readable representation of the network is obtained. In step 120, a node is selected. In step 130, all possible clusters 1, ... J of infected nodes after X transmission events are enumerated, assuming no recovery.

For X=2, these include all combinations of i plus two nodes at distance one from i, and i plus one node at distance one and one at distance two (within the limits of the local network topology). Each cluster is counted once for each way it can form. For example, a cluster of two nodes connected to i but not each other could form in two ways. If they are connected to each other, the cluster could form in four ways. In step 140, the degree of a cluster of nodes is determined as the number of edges connecting nodes inside the cluster to nodes outside.

In step 150, the normalized sequence $$d_1, \ldots, d_J = \frac{1}{\sum_j d_j}(d_1, \ldots, d_J)$$

is formed, where $d_j$ is the degree of cluster j. Then the expected force of node i is determined in step 160 as $$ExF(i) = -\sum_{j=1}^{J} \bar{d}_j \log(\bar{d}_j) \quad (1)$$

Finally, the expected force is output in step 170.

Preliminary investigations found that X=2 is already sufficient for predictive purposes.

One modification may be in order for SIS/SIR processes, inspired by the following. Imagine a node with degree one connected to a hub. While such a node will have a high expected force, its chance of realizing this force depends on transmitting to the hub before recovering. In networks where such nodes are common, it may be helpful to account for this factor by scaling node ExF by the log of twice the node's degree, $$ExF^M(i) = \log(2 \deg(i)) ExF_X(1) \quad (2)$$

multiplication by two being necessary since the log of one is zero.

Figure 2:
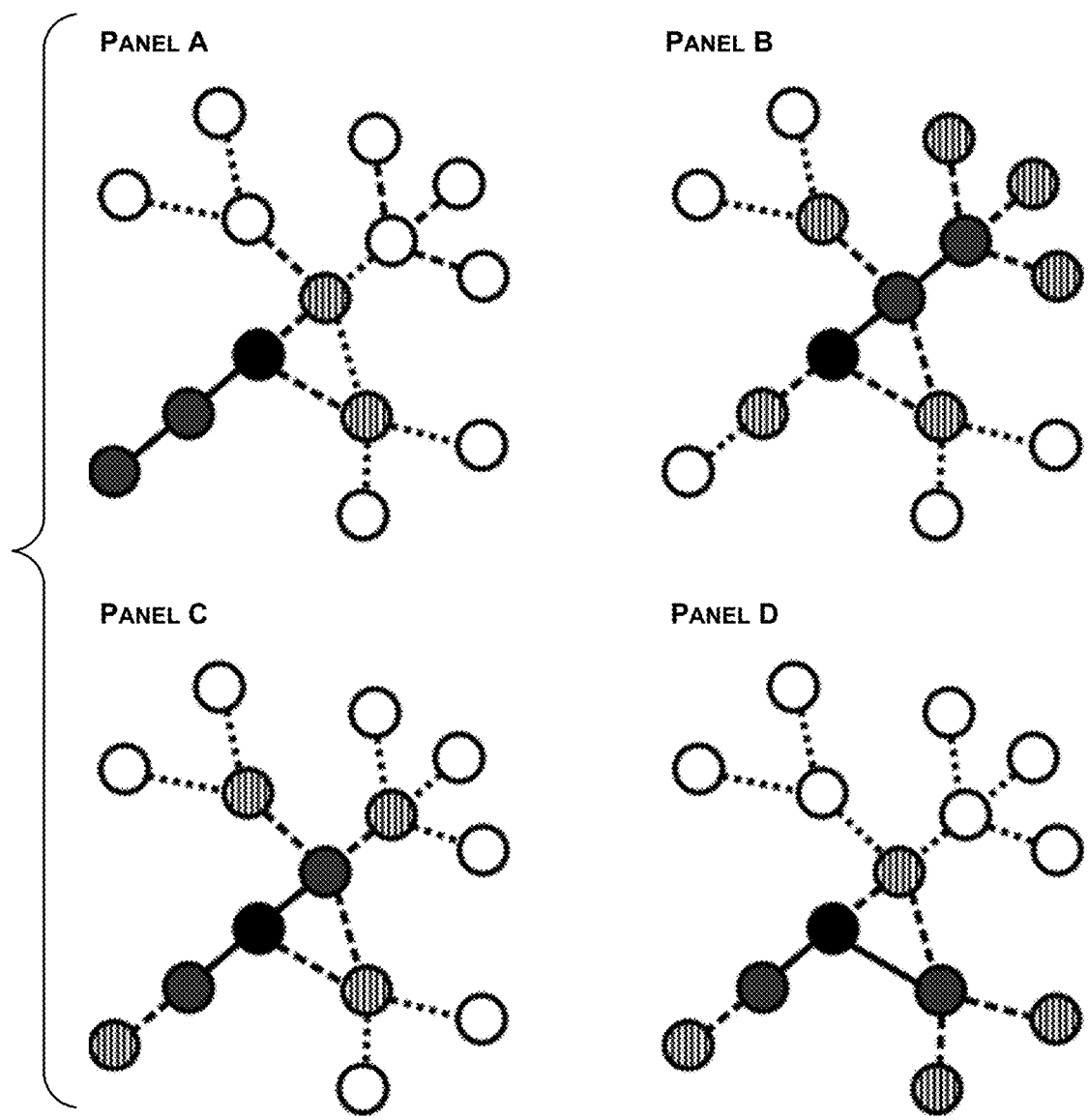
FIG. 2 is a schematic illustration of how the expected force is determined from the possible outcomes of two transmissions.

FIG. 2 is a schematic illustration of how the expected force is determined from the possible outcomes of two transmissions. In the example (sub) network above, the network will be in one of eight possible states after two transmissions from the seed node (red). Two are illustrated above, where the seed has transmitted to the two orange nodes along the solid black edges.

Each given state has an associated number of (dashed orange) edges to susceptible nodes (blue), the cluster degree. States containing two neighbors of the seed (panel a) can form in two ways or, if they are part of a triangle, four ways. In this example, the two transmissions can occur in thirteen possible ways. The expected force is the entropy of the (normalized) cluster degree.

Figure 3:
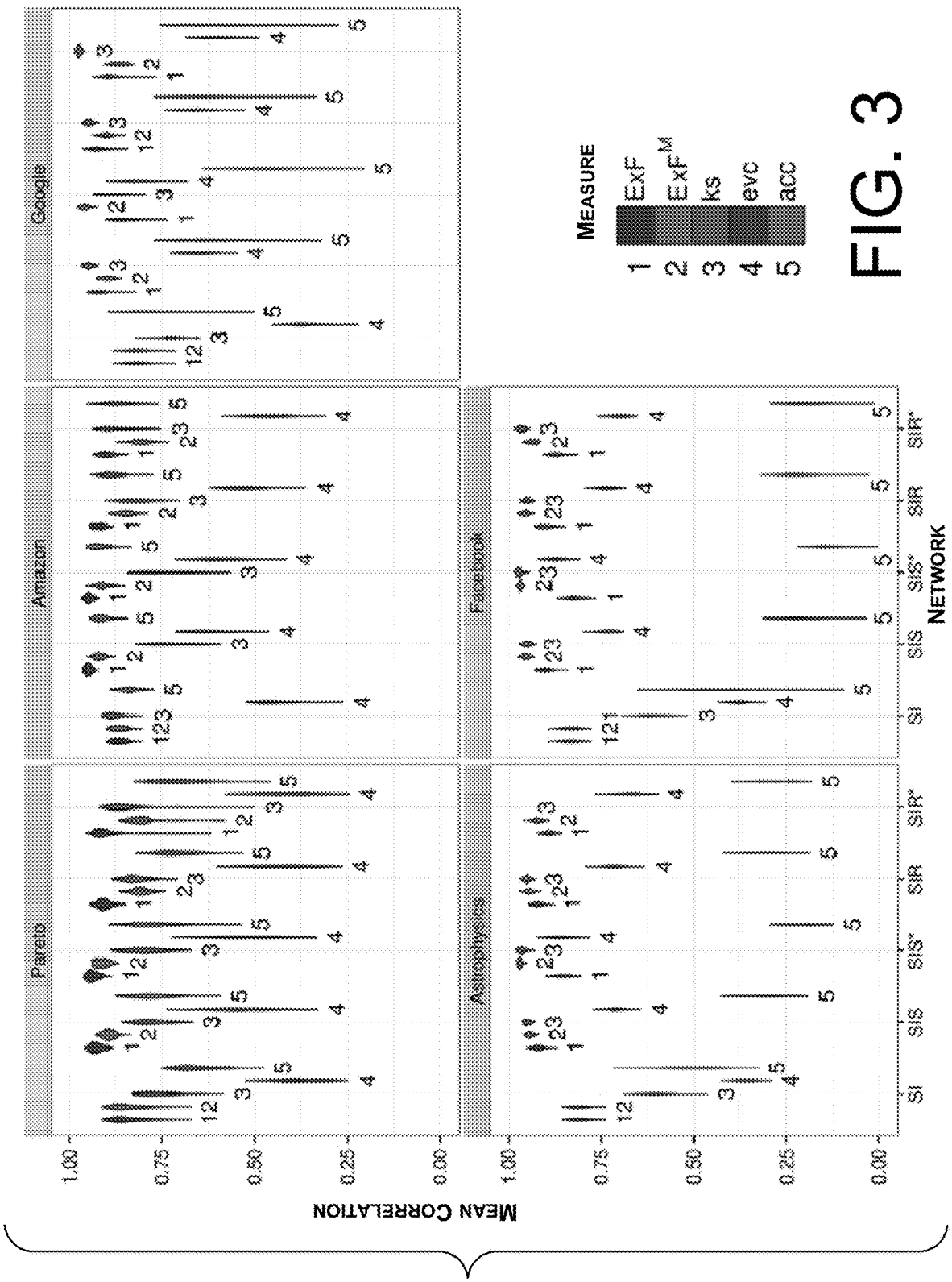
FIG. 3 shows a correlation of spreading power metrics to epidemic outcomes on simulated networks.

FIG. 3 shows a correlation of spreading power metrics to epidemic outcomes on simulated networks. Violin plots show the distribution of observed correlation values for each spreading process outcome in each network family. The expected force and ExFM (orange shades) are consistently strong, with mean correlations greater than 0.85 and small variance. The other measures (k-shell, eigenvalue centrality, and accessibility, blue-green shades) show both lower mean values and higher variance, as seen in the position and vertical spread of their violins. Each violin summarizes correlations computed on 100 simulated networks. Spreading processes (x axis) are suffixed to indicate simulations in continuous (–C) or discrete (–D) time. The epidemic outcome for SI processes is the time until half the network is infected. For SIS and SIR processes it is the probability that an epidemic is observed.

Figure 4:
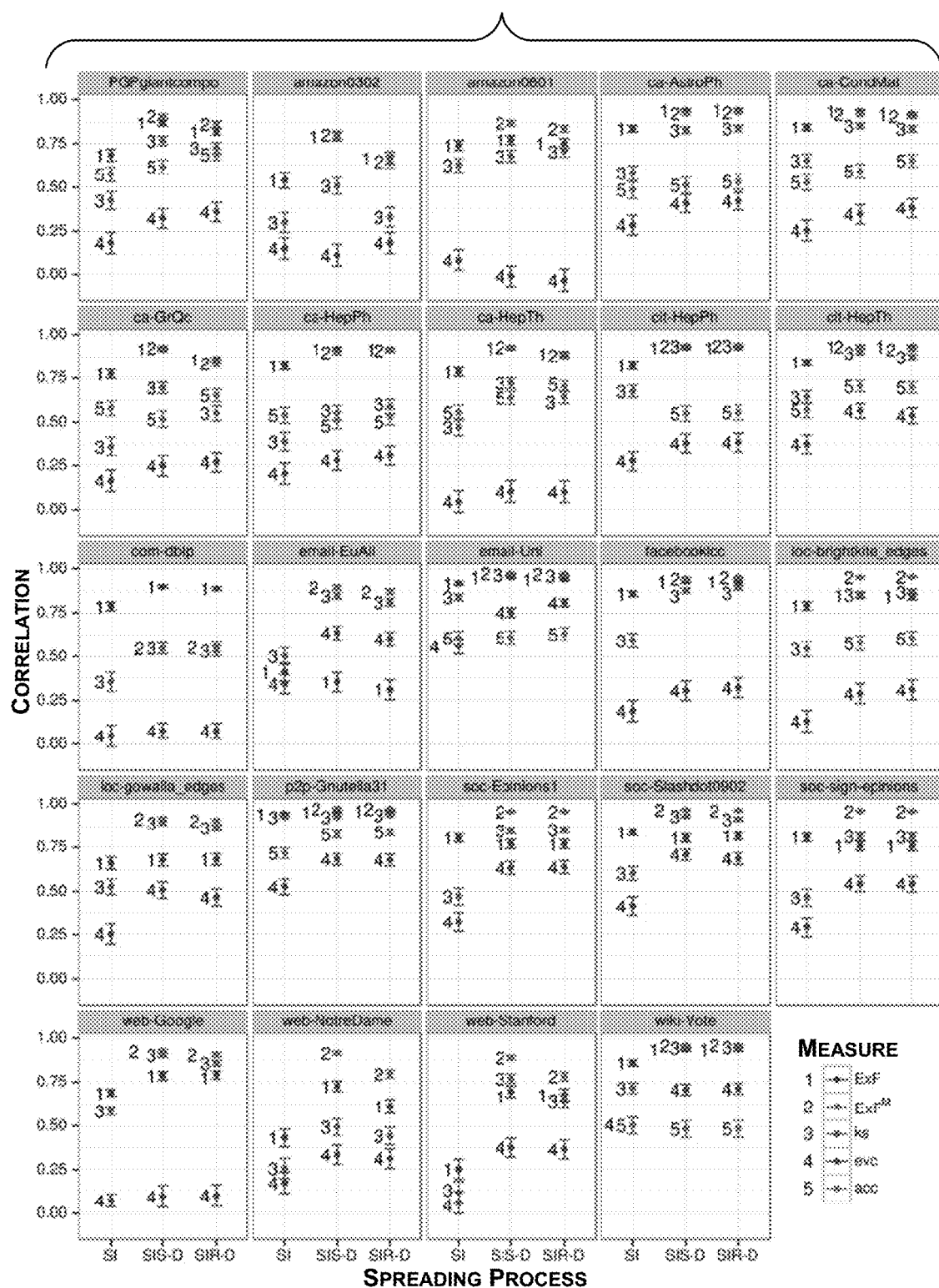
FIG. 4 shows a correlation of spreading power metrics to epidemic outcomes on real networks.

FIG. 4 shows a correlation of spreading power metrics to epidemic outcomes on real networks. Point and error bar plots show the observed correlation and 95% confidence interval between each measure and spreading process outcome on the 24 real networks. The expected force and ExFM (orange shades) show strong performance, consistently outperforming the other metrics (k-shell, eigenvalue centrality, and accessibility when computed, blue-green shades). The epidemic outcome for SI processes is the time until half the network is infected. For SIS and SIR processes it is the probability that an epidemic is observed.

The suffix \-D" indicates spreading processes simulated in discrete time. Individual panels are given as separate (larger) figures in Supplementary Figures FOO to BAR.

Figure 5:
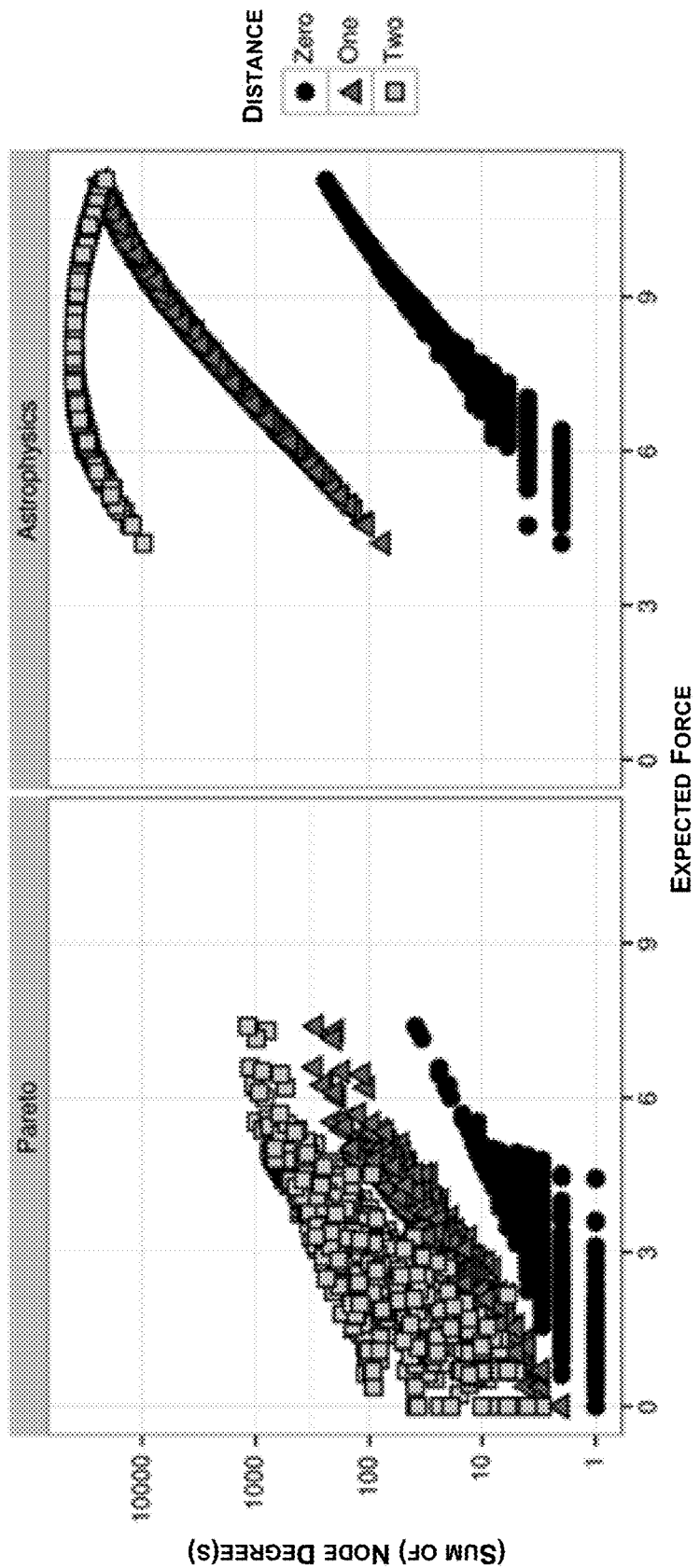
FIG. 5 illustrates how spreading power is a factor of a node's first and second order degree.

FIG. 5 illustrates how spreading power is a factor of a node's first and second order degree.

Plotting expected force (x-axis) versus node degree (orange), the sum of the degree of all neighbors (blue), and the sum of the degree of all neighbors at distance 2 (green) (y-axis is log scale) shows that for nodes with low ExF, the neighbor's degree has strong correlation to ExF, while for nodes with high ExF their own degree is more closely correlated. The result is accentuated in the denser collaboration network in comparison to the more diffuse Pareto network.

Figure 6:
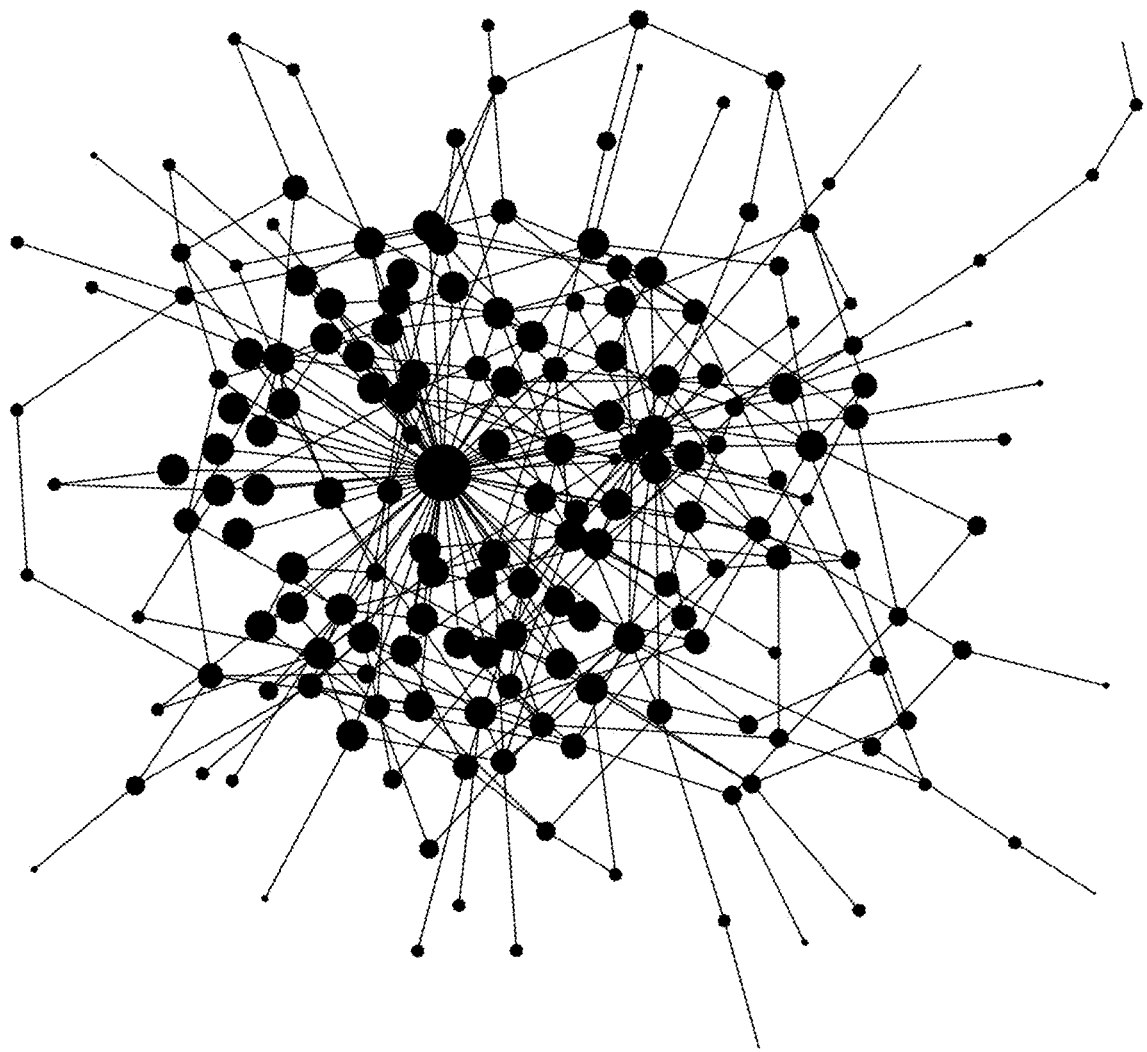
FIG. 6 shows an image of a graph comprising nodes and edges.

FIG. 6 shows an image of a graph comprising nodes and edges, wherein the nodes are, e.g. airports and wherein their size is scaled according to the node's relevance within the graph. Such an image of a graph, including the relevance scores may be done automatically and displayed to a user, who can immediately discern nodes of more and lesser relevance, without actually knowing the numerical scores. This permits an intuitive preliminary selection of nodes of interest for a particular analytical task.

If the network nodes are filtered, based on their relevance scores, the information required to be analyzed by a user may be reduced; a network may be viewed on a more abstract level.

Figure 7:
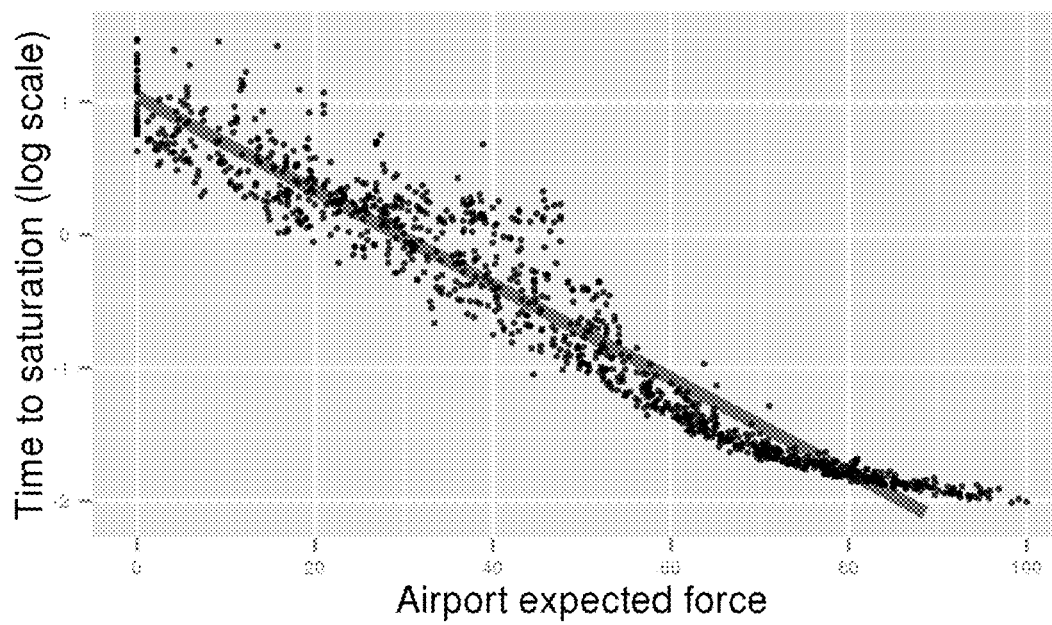
FIG. 7 shows a diagram wherein the (logarithm of the) time to saturation of a spreading process starting from a node is plotted against the spreading power/relevance/expected force of that node.
Figure 8:
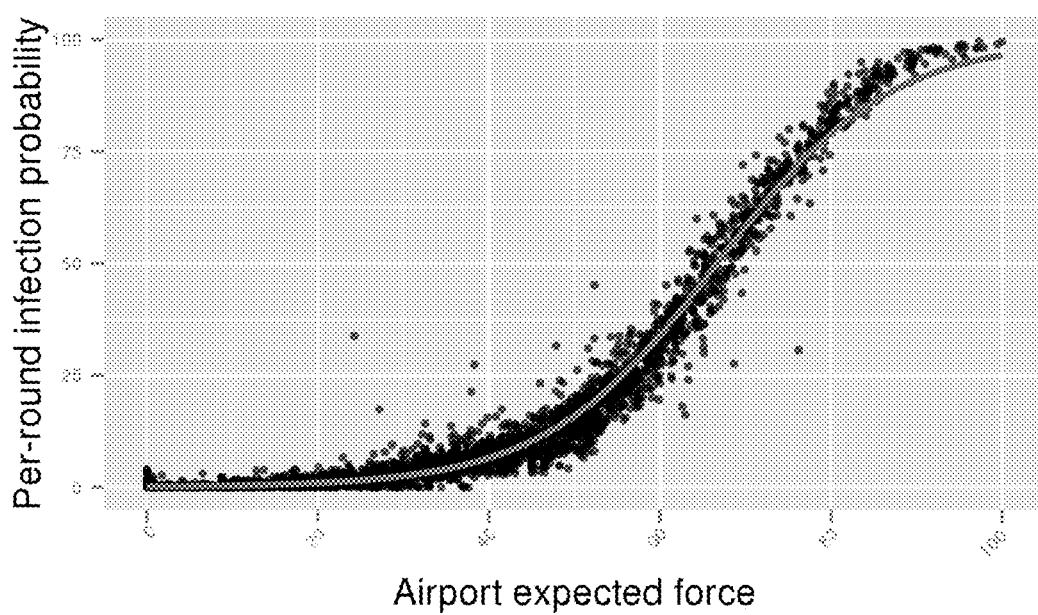
FIG. 8 shows a diagram wherein the per-round infection probability is plotted against an expected of network nodes, e.g. airports.

FIG. 7 shows a diagram wherein the (logarithm of the) time to saturation of a spreading process starting from a node is plotted against the spreading power/relevance/expected force of that node. Saturation is defined as the time when half of the network's nodes is reached by the spreading process. As the diagram shows, the correlation between these two quantities is very striking, confirming the predictive power of FIG. 8 shows a diagram wherein the per-round infection probability is plotted against an expected of network nodes, e.g. airports. At the start of a round, every infected airport/ node tries to infect each of its neighbors with a certain probability. If a node is infected in a round, it will start as un-infected on the next round. Per-Round infection probability in this model (standard susceptible-infected-susceptible model) corresponds to the frequency a node is infected in a given number of rounds, e.g. 1000. This number can be interpreted for example as the frequency of a certain rumor being heard by a particular node.

As the diagram shows, there is a strong nonlinear correlation between this quantity and amount of expected force.

Figure 9:
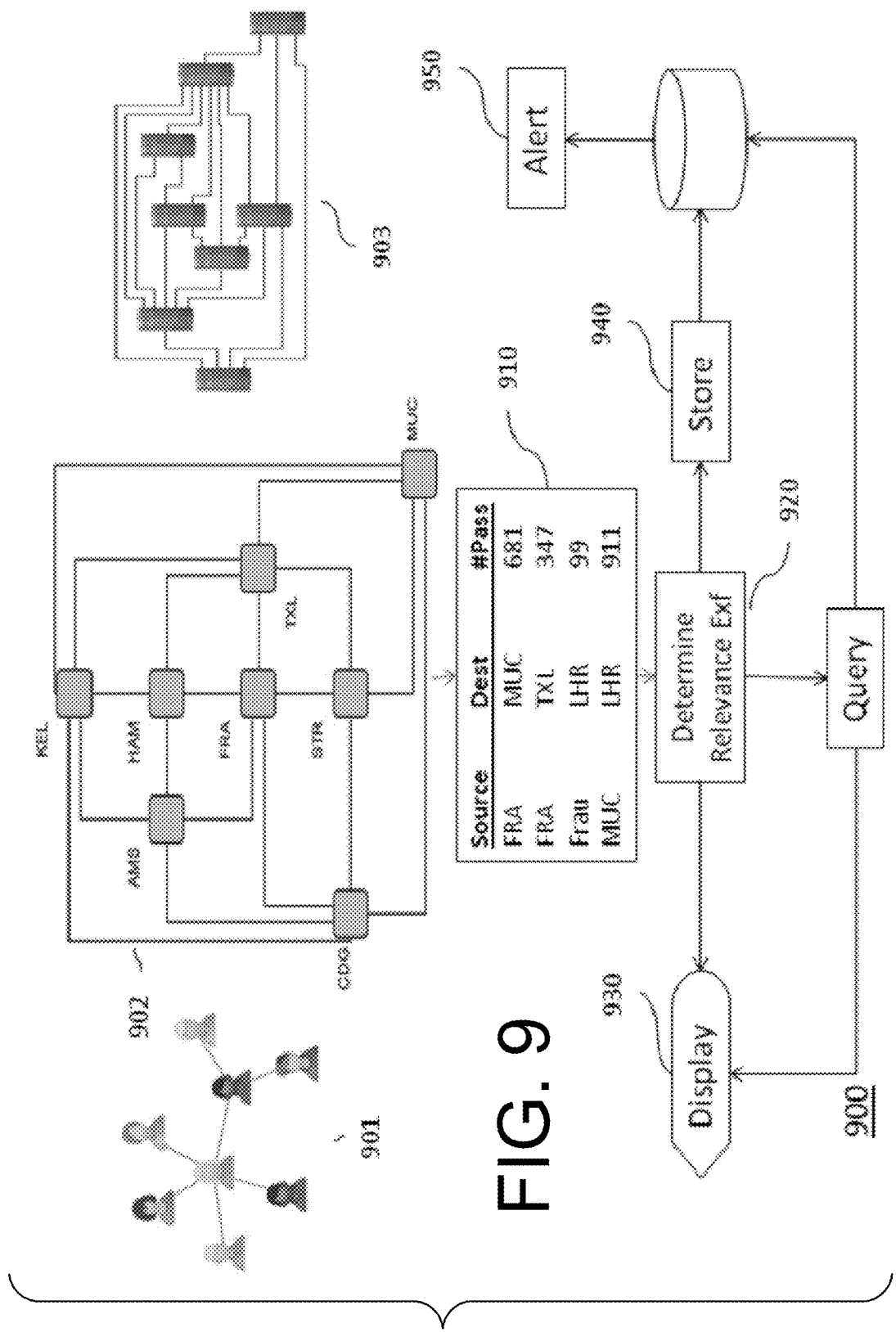
FIG. 9 shows a schematic diagram of a system 900 for monitoring a network according to another embodiment of the invention.

FIG. 9 shows a schematic diagram of a system 900 for monitoring a network according to another embodiment of the invention. Graphs 901, 902 and 903 are examples of networks. The center column shows processing stream.

In step 910, a representation of the network is obtained in a computer readable format. The representation may be full or partial, may represent physical connectivity (i.e. the wires connecting equipment in a data center, or the wires/transformers connecting electricity producing and consuming nodes in an electricity network), a mix of physical and virtual connectivity (i.e. the wiring structure and assigned IP addresses of all computers used by a certain organization), inferred connectivity (i.e. created from who follows who on twitter, or who has worked on a common project in an organization).

The representation as shown is an edgelist which may additionally contain more information about the network connectivity (the strength of a given edge, a time stamp for when the edge is observed, . . . ). This representation is fed to one or more computer processing unit(s), to compute the expected force of some or all nodes in the network, where the "network" is defined from the computer readable representation.

Additionally, the network may first be pre-processed, or may otherwise include node and/or edge annotations. For example, nodes could be initially labeled by function or class (i.e. in a power grid, either generator or load, in a corporate structure by department, in a social network by relationship) or by membership in some type of community (possibly defined via graph-theoretic methods in the preprocessing step), or by some other approach which classifies nodes and/or increases/reduces the granularity of the network structure.

In step 920, one or more computer processors are instructed to apply the algorithm to the network representation so as to compute the ExF of some or all of the nodes in the network. The calculation of the ExF can be modified to account for features determined in the pre-processing stage. For example, the ExF could be calculated at the level of community rather than individual node, or using different weights for nodes or connections to nodes of certain classes. The results of the analysis are used to modify the network structure as above and/or stored and/or displayed.

In step 930, the user is presented with a list of nodes to monitor (i.e. the top XX most influential nodes in the network, the top XX most influential nodes in each category/ department, the top XX most influential contact who work at company Z). In an organization-wide computer security application, where nodes are i.e. individual computing devices or user accounts, this could be used to determine the amount of monitoring resources to allocate to each node.

Alternatively, the results can also be presented as a histogram of values and a single value for a node of interest; as a set of histograms by device type, e.g. mobile devices, workstations, and servers connected in a corporate intranet; as a pictorial representation of the network with nodes sized by expected force.

They can additionally be stored in a database in step 940. The database is used to support queries, such as all of my contacts at company X, sorted by influence; pandemic outbreak risk for African airports; or, by calculating the expected force at different timesteps, the temporal connectivity profile of each server in a corporate intranet.

Additionally, domain/business logic may be applied to either the raw ExF score, or in reference to historical values from the database, to produce alerts in optional step 950. The domain logic may combine the ExF and an observed signal to identify nodes of interest. A user may be presented with a list of nodes to monitor and why they were flagged as interesting.

In a preferred embodiment, the inventive method can be applied to monitor a dynamic network. By repeating it at regular intervals, historical ExF values may be established for each node. The monitoring reports nodes whose ExF value deviates from historic levels. In a organization-wide computer security application, this could be used to identify nodes who suddenly change their connectivity pattern.

In an organization-wide computer security application, the business logic could stratify nodes by expected force and compare predicted with actual output. Output could, for example, be measured by volume, triggering an alarm when a highly central node goes silent. Alternately, it could be by content—an alert from a highly central node may be deemed more relevant than one from a peripheral node. Alternately, it could be access: identifying peripheral nodes (which presumably are less monitored) which have access to highly valuable information or highly sensitive equipment.

In a further embodiment, the network structure itself may also be dynamic. The dynamics may occur on various time-scales; they can be stable over the time-frame of the decision process, or their dynamics may be part of the decision process. An example of the first is an evaluation of the impact of some intervention by measuring the ExF (or distribution of ExF values) before and after the intervention. An example of the second is a load-balancing scheme which attempts to minimize fluctuations in node ExF, or continually monitor the network for nodes/regions whose ExF is growing/shrinking at interesting rates.

The system is further enabled to allow awareness and monitoring of changes to the network representation. This can be by uploading the full current network configuration at fixed or irregular intervals, or partial updates again at fixed or irregular intervals. For example, the full network representation could be uploaded to the system every evening, or each action taken on the network could update the representation. At updates, the system calculates the ExF of some or all nodes as above. The values are stored in some database along with a time-stamp.

Further analysis may then be applied to evaluate temporal structure of the ExF measures, on all or part of the network.

The inventive ExF measure can also be employed to provide better search methods for document databases.

Node rankings underpin search engines such as Google. The invention gives more meaningful and more stable results than those produced by i.e. Google's PageRank algorithm. This can power better search results in a number of domains: Internet/WWW A better Internet search engine. It is now expected that large entities, be they corporate or government, maintain an expansive web-based interface to their inner workings. These intranets are the primary manner in which people (both employees and customers/citizens) interface with the entity. Custom search engines for these intranets is a growing need. Specialised knowledge databases Likewise, knowledge is increasingly stored and accessed via computerised databases. Two especially relevant domains are legal and medical. An example is IBM Watson. A key feature of Watson is its claimed ability to measure its confidence in its answers. Better metrics of the relevance of search results would lead to more accurate confidence scores. With an increasingly large portion of our productivity, both personal and professional, in digital form, search is becoming increasingly important to organising and retrieving our documents. Personal search engines, to i.e. organise digital photos and link with other relevant information (i.e. contemporary emails). Search is also becoming social. One does not want to just find "Chinese restaurant Munich"; required are results ranked by the credibility of the reviewers or by which locations are popular with our friends. The invention can be used to accurately quantify the significance of the participants; these weights are then used to re-weight the relevance based search results so that the finally returned list of search items is a "friends" ordering of the relevant search hits.

Figure 10:
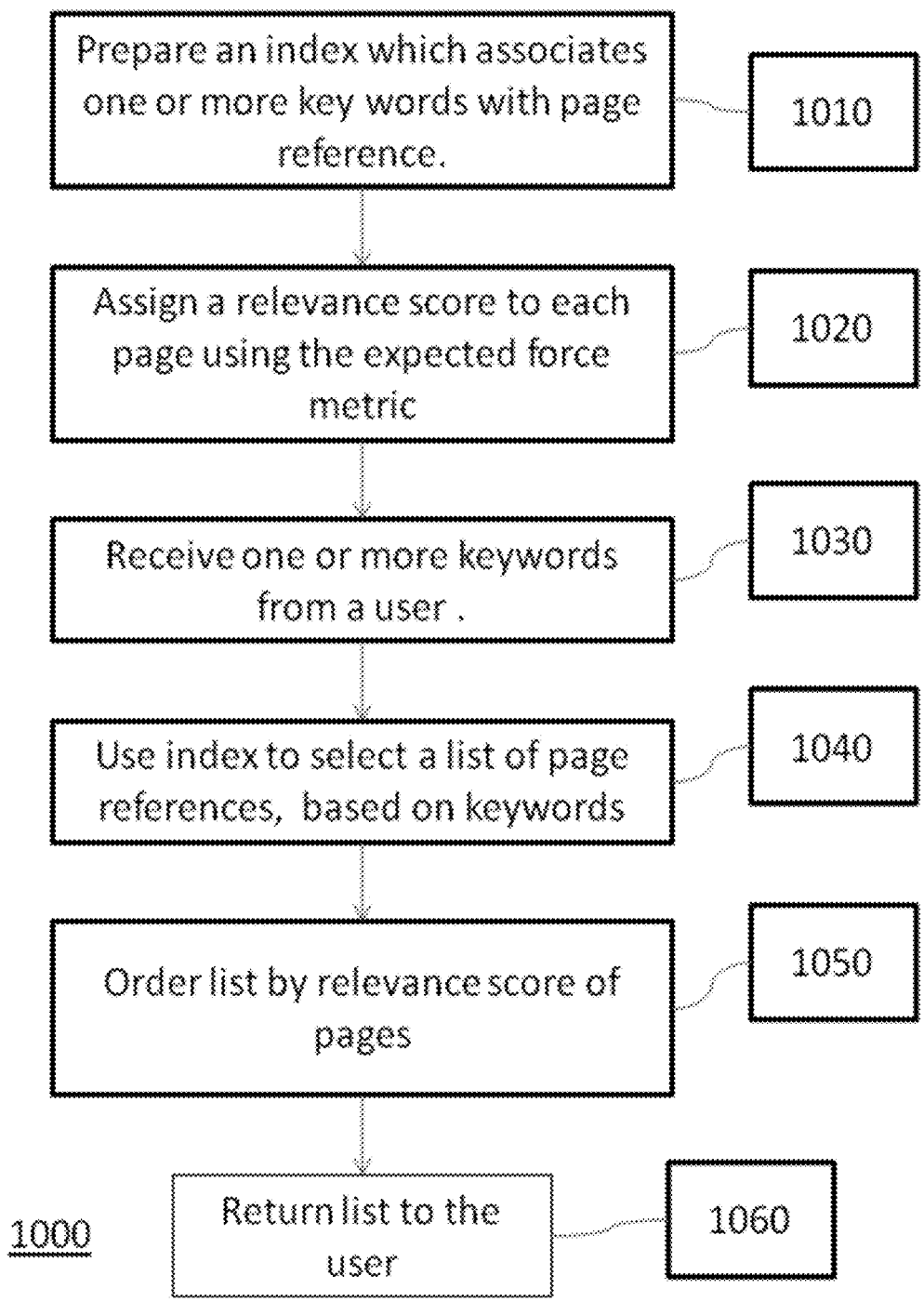
FIG. 10 shows a schematic flowchart 1000 of a method for searching network based on a relevance of node in the network according to a different embodiment of the invention.

FIG. 10 shows a schematic flowchart 1000 of a method for searching network based on a relevance of node in the network according to a different embodiment of the invention. Here, the expected force values are stored in a database, along with other information regarding the nodes. Expected force values are used to order search queries placed into the database.

In step 1010, an index which associates one or more key words with page references is prepared, wherein the page references may be URLs referencing documents in the World Wide Web. In step 1020, a relevance score is assigned to each page using the expected force metric. In step 1030, one or more keywords are received from a user. In step 1040, the index is used to select a list of page references, based on the keywords. These selected page references are then ordered by their relevance score in step 1050, and returned to the user in step 1060.

This process is similar in overall structure to that used by the Google search engine, but differs in the determination of the relevance score. The scientific literature has demonstrated several weaknesses in the PageRank score which is the basis of the original Google relevance score. The PageRank algorithm includes a damping factor, and the choice of damping factor has a strong influence on the resultant relevance scores. Bressan et al (Marco Bressan and Enoch Peserico, Choose the damping, choose the ranking?, Journal of Discrete Algorithms, 2010, 8, p. 199-213, 2) proved that at least on some graphs, the top k nodes assume all possible k! orderings as the damping factor varies, even if it varies within an arbitrarily small interval (e.g. [0.84999, 0.85001]). Son et al. (Son, S-W. and Christensen, C. and Grassberger, P. and Paczuski, M., PageRank and rank-reversal dependence on the damping factor, Phys Rev E Stat Nonlin Soft Matter Phys, 2012, vol. 86, p. 066104) investigated PageRank scores of internet web pages as a function of different choices of the damping factor, finding that rank reversal occurs frequently over a broad range after even slight changes to the damping factor. PageRank is also sensitive to how the network is observed. Ghosal et al (Ghoshal, Gourab and Barabasi, Albert Laszlo, Ranking stability and superstable nodes in complex networks, Nat Commun, 2011, vol. 2, p. 394) show that for random networks the ranking provided by PageRank is sensitive to perturbations in the network topology, making it unreliable for incomplete or noisy systems. Pei et al (Sen Pei and Lev Muchnik and Jose S. Andrade and Zhiming Zheng and Hernan A. Makse, Searching for superspreaders of information in real-world social media, Scientific Reports, vol. 4, 2014) reach an even stronger conclusion by following the real spreading dynamics in a wide range of networks, finding that PageRank fails in ranking users' influence. Ghosh and Lerman (Rumi Ghosh and Kristina Lerman, Rethinking Centrality: The Role of Dynamical Processes in Social Network Analysis}, Discrete and Continuous Dynamical Systems Series B, 2014, vol. 19, pp. 1355-1372, number 5, July) echo this finding, noting that the random walk model which underlies the PageRank algorithm is not appropriate for social phenonena, and that PageRank based rankings do no show good agreement with empirical influence rankings.

The expected force metric overcomes all of these shortcomings. It is parameter-free, thus its results are not dependent on the choice of some arbitrary parameter. It depends only on local information, making it robust for incompletely observed or noisy networks. The underlying model is derived directly from the mathematics of spreading processes, allowing it to accurately match real spreading dynamics and empirical influence rankings.

The expected force presents an additional advantage over PageRank in that its relevance score quantifies node influence. PageRank, in contrast, is designed to provide a ranking which identifies the most influential nodes, but does not provide qualitative differences between the different ranks. PageRank (when its results are correct) can tell you that node A is more relevant than node B, but not by how much. The expected force is designed explicitly to provide such information, and its strong correlations to epidemic outcomes show that it succeeds in this task.

Modern industrial infrastructure is made by networking components. The invention can help optimise the design of such infrastructure, be it existing infrastructure which must be built out in a better way or the installation from scratch of a new infrastructure project. Here, the contribution of a node may be interpreted in terms of i insight into how (altering) node connectivity impacts network capacity, better estimates of the quality/capacity of the physical equipment requirements, load balancing and routing,—expected level of fluctuations, expected impact of failures/vulnerability analysis, pricing inputs to the system.

Specific areas of application include the electricity grid. In a smart electricity grid, power production is decentralized to many small producers with erratic power creation, while the large power plants retain responsibility for only a base level of the total electricity in the system. Load balancing and routing remain challenging problems in mobile phone networks, as individual phones move in and out of the range of various cell towers. The invention can be used to quantify each towers current capacity as a function of its connections to the rest of the network and the number of phones connected to that tower; or, assignment of phones to the towers with range can be further scaled by the contribution of each tower to allow maximal traffic speeds across the entire network. Up to 4% of current electricity generation goes towards the internet. Likewise, as companies move information to the cloud, the routing of information between user and cloud storage server locations becomes increasingly important. Better routing of traffic flow can cut costs and/or signal times. Large-scale public wifi installations are becoming the norm, not only for venues which expect substantial crowds (Olympic villages, large convention centers, . . . ) but growingly for cities (Luxembourg has a city-wide public wifi network) and vacation destinations (El Hierro has installed an island-wide public wifi network). These systems require complex physical infrastructure in the form of a network of routers, repeaters, and antennas. Road/transportation Optimal routing is a major concern of delivery/courier services, logistics companies, taxi firms, Ubercar, and even personal GPS devices (also Google/Apple maps)

Figure 11:
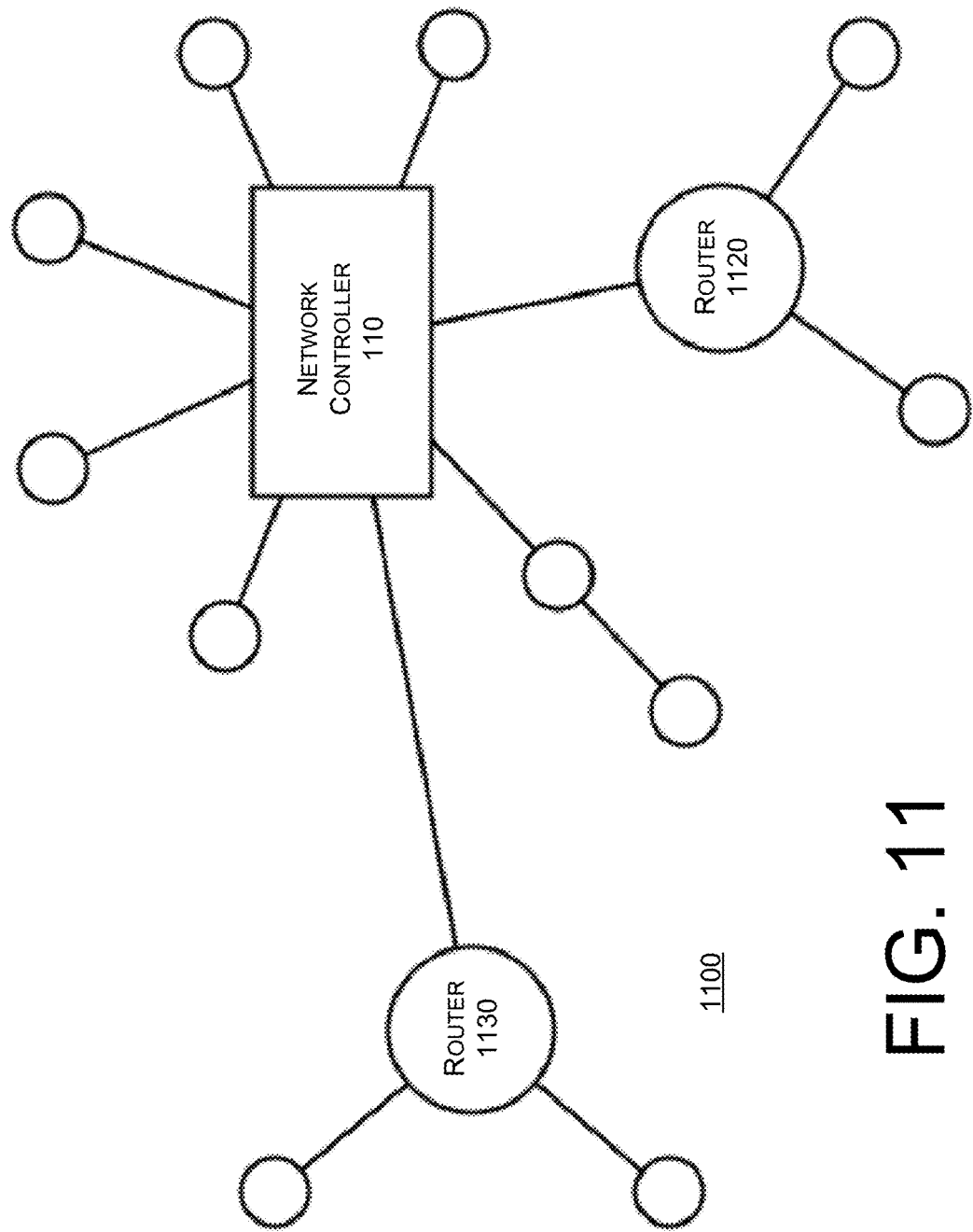
FIG. 11 shows a network with a network controller used for controlling a network element, based on a relevance score according to an embodiment of the invention.

FIG. 11 shows a network 1100 with a network controller 1110 used for controlling a network element, based on a relevance score according to an embodiment of the invention. For example, the network can be a computer network with several routers, but also telecommunications or electricity network.

In a routing application, the method comprises selecting a network element, as such as a router 1120. The router 1120 can be virtual, as in a datacenter management system which has pre-allocated a certain amount of memory and/or processing time and/or other system resources. It can also be a network relay or a WiFi router. The network controller 1110 can monitor the network elements, e.g. their current load. To that purpose, the method determines an ExF score of a network element, e.g. a network element wherein a certain load has occurred. In the application, this may be the ExF score of the selected router, representing its connectivity/capacity, i.e. how much the router contributes to routing the network traffic. In a different application, the ExF score not of the selected network element but for example, one of its neighbouring elements are determined, as an approximation.

In a further step, the method comprises generating a control signal, based on the determined ExF score. In the present application, the control signal is a signal representing a message according to a router communication protocol. It may indicate, that the router increases its capacity, for example if the load of the router has increased. By taking the ExF score of the router into account, network congestion can be avoided very effectively, because the score pinpoints those nodes, where capacity increases a most effective in terms of cost. When the control signal was generated, it may be sent to the selected network element.

Alternatively, the control signal may be sent to at least one neighbour element of the selected element, for example to the router 1130, if the selected element cannot be controlled by itself, the neighbours can be shut off or told to reconnect/reorganize. Using the ExF score allows choosing the most influential neighbours for modification first. In a further embodiment, the score of a neighbour element may be determined, e.g. for selecting the highest score neighbour to be used for sending a message to the whole network.

In a further embodiment, the method also comprises comparing the determined ExF score with a current or projected load of a network node and changing connectivity/capacity of the network element, if a certain threshold is surpassed.

APPLICATIONS

Social media also create explicit networks of friends and followers. Here, the value of a node is its ability to spread information (giving economic value via advertising/promotion), relevance as a passive source of information (i.e. the target of a search)

Given a social network, the invention can measure the spreading power of each person in the network. Users agree to advertise products, and are paid a rate proportional to their ranking, thereby allowing more rational pricing.

In a realization of an application of the invention to social media, a node would be defined as the person represented by the social media account. An edge could be defined by a standard relationship dependent on the social media platform. For example, on Facebook, each "friend" relationship would be an edge, on Twitter, each "follower" relationship would be an edge, and on Linked In, each "connection" would be an edge. Note that this definition allows the current invention to span several social media channels, if a person (node) operates several social media accounts, the set of edges to this person could include all Facebook friends and also all Twitter followers, and/or other social media accounts. People are not limited to one channel of communication; by providing a principled and consistent way to measure influence across multiple channels the invention creates a meaningful score, which measures their influence over all channels. The alternative is to add together a person's friend count on Facebook, follower count on Twitter, and number of connections on Linked In. This simple addition does not take into account the complexities of network and spreading dynamics across these different networks, thus is not as reliable as the method of the current invention.

This definition can be further expanded to assign different weights and directionality to the different edges. Several weighting schemes are possible. For example, edges could be weighted by network type, for example Facebook friend relationships might be given more weight than follower relationships on Twitter. Directionality could depend on the type of network. If A "follows" B on Twitter, but not the converse, then information flows from A to B. Thus, a directed edge could be created from A to B, while no similar edge exists from B to A.

Edges could also be weighted by activity, for example the number of "likes" or "retweets"—if a person frequently "likes" posts (or "retweets" posts) by another specific person, the edge between those two people would receive a higher weight than an edge between two people with less interactions. Under this scheme, the edge weight could also be directional. If person A retweeted all of person B's tweets, and person B never retweeted person A's tweets, then the edge from A to B could have a different weight than the edge from person B to person A. Activity-based weighting could further be normalized by time (i.e. recent activity counts more than older activity) or posting activity (i.e. person A posts 100×/day, and person B posts 1×/day. Person C "likes" half of person "A"s posts, i.e. 50/day, and "likes" all of person B's posts, i.e. 1/day. Even though C gives A many times more likes than B, the like given to B could create a larger edge weight between C and B than the weight between C and A).

Edges could also be weighted by similarity. If an edge joins A and B on multiple social media channels, then the weighting of the edges could be increased to represent this. Similarity could also be measured by shared backgrounds. Assume A and B went to the same college, and this fact is available to the system. Then edges between A and B could be given increased weight to reflect this shared connection. Similarity can be extended to include multiple categories typically recorded in social media, including work history, common hobbies, posting on similar topics, etc.

In addition to creating person-specific scores as discussed above, the same method can be extended to make person and topic specific scores, allowing for the measure of influence a person has over a particular topic. This could be accomplished using edge weights by including the number of interactions on the topic in the weighting scheme. A more practical approach would be to filter the data prior to calculating the score. For example, if we wanted to measure the influence of a person on "pet care" on the Twitter network, we could create a filter, which identifies each of the person's tweets in the last 12 months, which referenced the topic pet care. We then measure how many of these tweets were retweeted by one of the person's followers. Only these followers are included in the set of the source node's followers, where each account, which retweeted, is considered a node, possibly also including an edge weight based on the number of retweets. We then repeat this process/filtering for each of these follower nodes, thus obtaining the local neighborhood structure needed for the computation of the source node's relevance.

These additional refinements provide a dramatic improvement in measuring a node's spreading power in comparison to simple follower counts. Combining edges across networks captures a user's entire social network, no longer limiting it to a single channel. Weighting edges allows the influence score to include user activity and other social factors such as shared histories. Filtering allow the generation of a topic-specific spreading score.

The information necessary to obtain these node and edge requests could be obtained by querying the social media provider's services. Queries can include account information, account histories, account activity histories, ect. Additional filters and processing steps may be necessary, for example, filtering only for people who have "liked" a post made by the query node within the last six months, and processing by computing an exponentially weighted moving average of the percent of posts per day, which were given likes, to generate a final weighted edge. As another example, queries could be filtered to include only posts on a certain topic. Queries could be made recursively, first querying for edges from the source node, then edges from the endpoints returned by the first query, then edges from the endpoints of the second query. The results of each query can be aggregated and stored locally either in memory or digital or other storage using standard graph representations, i.e. as an edge list. Once the local graph neighborhood has been obtained through these queries, the value of the source node is computed and returned to the user.

Critically, the current invention only requires information about the local neighborhood of the source node to determine relevance. Such data can be obtained and held in computer memory. In contrast, other methods of measuring centrality, such as the Eigenvalue centrality, require computing operations on the entire network, i.e. the entire friendship structure of each person on Facebook. Given that Facebook has over 10 billion user accounts, the resulting matrix of all user relationships is too large to fit in working memory of even advanced supercomputers. Thus centrality measures based on the adjacency matrix cannot be used. Further, the current invention is robust against missing data.

Given a social network, or a set of social networks, the invention can measure the spreading power of either a single person in the network or multiple people in the network. An accurate measure of a user's ability to spread information is valuable to brand managers and advertisers. Users agree to advertise products, and are paid a rate proportional to their ranking, thereby allowing more rational pricing. Brand managers can use the rating to triage false and/or negative stories about the brand. It is becoming more common for malicious actors to post false yet damaging stories; knowing the spreading power of the person posting could help the brand manager evaluate the magnitude of the action.

A person's rating can also be valuable as a passive source of information. The brand manager might filter potential influencers based on their level of influence prior to discussing price and/or terms. Social networks offer premium search filters, e.g. for Recruiter and Sales Navigator offerings which allow users to filter on job function and seniority level. The social network could use the current invention to give recruiters and salespeople additional insight into a potential contacts importance or influence within the company.

In comparison to "Klout" (www.klout.com), the invention provides a more accurate measure of a person's influence.

Measuring the influence of a social media account can also be useful in the detection of fake news. The influence measure gives an estimate of the expected rate of spread of content from a given user. If a certain user post is spreading much faster or much slower than expected, this data point could be a signal that the spread of the story is being artificially accelerated or suppressed, which is indicative of a focused campaign around a topic.

Node quantification can be made more fine-grained by tying it dynamically to user content. Rather than search top-down for structure, it is possible for, e.g. Twitter to track a user's network for each individual hashtag that they post, in real time. The Twitter user's profile would then include their rating on each topic they tweet about, metrics that Twitter could use for its own purposes or which the user could use as above for i.e. paid product promotion.

In the above applications, the item to be rated was a social media account and/or the person associated with that account. Similar applications could be based around rating topics rather than individual users. Social media users will commonly use hashtags to associate their post with a term. A network model can be built by considering each hashtag in a set of posts as a node. An edge is created between two hashtags if they are mentioned in the same posting, where this edge can also be given a weighting based fully or in part on the number of such pairings. The invention allows an accurate evaluation of the relevance of a given hashtag, which could i.e. help brand managers identify which hashtags to use for a marketing campaign or which images (based on associations between images and hashtags), or i.e. make hashtag search more relevant. Such a network can be built without the use of hashtags, by using some other method to identify the topics in a post, for example simple word overlap or a more sophisticated machine learning algorithms.

The invention is useful for the identification of fake user accounts (so-called bots or botnets). Growth in user influence over time, as measured using the current invention, will be different for organic growth than for artificial growth, thus providing a metric of the probability that an account is fake. A collection of mutually linked accounts with similar influence scores could indicate a botnet.

Internet retailers such as Amazon and Netflix commonly list "related items" after each displayed product; such product relationships are stored as a network, e.g. the Amazon co-purchase network. The invention accurately quantifies the importance of each node on the network. Such networks tend to be dynamic, as people's tastes change over time and as new products become available. Hence, the advantage of the dynamic nature of the invention, which allows the score of each node in the network (where nodes are products) to be updated with every purchase, giving extremely fine-grained resolution of actual product relationships. Taking it in another direction, the local nature of the inventive method means that it can be computed independently for each user, allowing for more user-centric recommendations.

The rating need not be static. In all of the cases above, dynamic monitoring of changes in the rating are also of interest. An influencer who has recently jumped in influence but has not yet raised their price, a malicious story which is gaining in influence, a sales/recruiting contact who has recently increased their reach in an organization, the growth or shrinking of relevance of a topic, etc.

This dynamic information can be obtained by using the invention to obtain the value of the node of interest on a regular schedule and storing the results in a database. The system could then provide the user of the system with a display of the node's influence over time. Additionally, when storing the value in the database, additional computations could be run to measure the amount and/or the rate of change over a specified time and/or prior observations. Such a system could be extended to monitor a list of nodes, where the nodes are people, social media accounts, hashtags/topics, products, etc. The system would conduct, on a scheduled basis, the necessary queries to obtain the local network structure for each node on the list. It would then measure the influence of each node. It would finally output to the user a list of nodes, which showed significant increase/decrease of influence. Significance could be determined by the system (i.e. a greater than 1 standard deviation or some other automated determination) or by a parameter entered by the user.

Assuming proper historical data is available to the system from the underlying network (social media platform, purchase patterns, . . . ), the dynamic evolution of influence could also be computed by multiple queries to the data, where each query was restricted to the state of the system at a given point in time. For example, the first query would be limited to products co-purchased in April 2010, the second query to products co-purchased in May 2010, etc. Here, "query" means all data requests necessary to compute an influence score; as discussed above this may require multiple data requests to conclude.

IMPLEMENTATION

As noted above, example embodiments may include computer program products. The computer program products may be stored on computer-readable media for carrying or having computer-executable instructions or data structures. Such computer-readable media may be any available media that can be accessed by a general purpose or special purpose computer. By way of example, such computer-readable media may include RAM, ROM, EPROM, EEPROM, CD-ROM or other optical disk storage, magnetic disk storage or other magnetic storage devices, or any other medium that may be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is an example of a computer-readable medium. Combinations of the above are also to be included within the scope of computer readable media. Computer-executable instructions include, for example, instructions and data which cause a general purpose computer, a special purpose computer, or a special purpose processing device to perform a certain function or group of functions. Furthermore, computer-executable instructions include, for example, instructions that have to be processed by a computer to transform the instructions into a format that is executable by a computer. The computer-executable instructions may be in a source format that is compiled or interpreted to obtain the instructions in the executable format. When the computer-executable instructions are transformed, a first computer may for example transform the computer executable instructions into the executable format and a second computer may execute the transformed instructions.

The computer-executable instructions may be organized in a modular way so that a part of the instructions may belong to one module and a further part of the instructions may belong to a further module. However, the differences between different modules may not be obvious and instructions of different modules may be intertwined.

Example embodiments have been described in the general context of method operations, which may be implemented in one embodiment by a computer program product including computer-executable instructions, such as program code, executed by computers in networked environments. Generally, program modules include for example routines, programs, objects, components, or data structures that perform particular tasks or implement particular abstract data types. Computer-executable instructions, associated data structures, and program modules represent examples of program code for executing steps of the methods disclosed herein.

The particular sequence of such executable instructions or associated data structures represents examples of corresponding acts for implementing the functions described in such operations.

Some embodiments may be operated in a networked environment using logical connections to one or more remote computers having processors. Logical connections may include for example a local area network (LAN) and a wide area network (WAN). The examples are presented here by way of example and not limitation.

Such networking environments are commonplace in office-wide or enterprise-wide computer networks, intranets and the Internet. Those skilled in the art will appreciate that such network computing environments will typically encompass many types of computer system configurations, including personal computers, hand-held devices, multiprocessor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An example system for implementing the overall system or portions might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer readable media provide nonvolatile storage of computer executable instructions, data structures, program modules and other data for the computer.

Software and web implementations could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, hardware implementations, or equipment for receiving manual inputs.

I claim:

1. A computer-implemented method for determining a relevance or rating score of a particular user in an electronic social network, wherein connections between users are represented by a social graph, the method implemented on a computer system comprising software and hardware, including one or more computer processors and memory, said memory including a computer-readable non-volatile memory, the method comprising:

said computer system obtaining, based on the social graph, a digital representation of a local connection structure of the particular user in the network in said computer-readable non-volatile memory of said computer system;

determining, by said computer system, a numerical value characteristic of a relevance of the particular user in the social graph; and said computer system using the numerical value to determine, in real-time, one or more aspects (i) of the particular user and/or (ii) of one or more activities or actions of the particular user in the electronic social network, wherein the numerical value is determined based on the connection structure of the particular user, and wherein the numerical value is determined based on degrees of all sets of users in the social graph reachable from the particular user using at most k connections, where k is a fixed preset positive integer number, and based on a degree determined for each enumerated set, wherein the degree of a set is determined as a number of connections connecting users inside the set to users outside, and wherein the numerical value is dynamic, the method further comprising:

repeatedly determining the numerical value for the particular user; and using the numerical value, determined over time, to determine a degree of influence of the particular user over time.

2. The method according to claim 1, wherein the number of connections k is equal to 2.

3. The method according to claim 1, wherein the number of connections k is equal to 3.

4. The method of claim 1, wherein the numerical value is obtained as a real number.

5. The method of claim 2, wherein the degree is combined with a logarithm of the degree.

6. The method of claim 2, wherein the numerical value is scaled by a logarithm of twice the particular node's degree.

7. The method of claim 1, wherein the one or more activities or actions of the particular user in the electronic social network comprise the particular user posting content, and wherein the numerical value is used by the computer system to determine whether the content comprises fake news.

8. The method of claim 1, wherein the one or more activities or actions of the particular user in the electronic social network comprise the particular user posting content, and wherein the numerical value is used by the computer system to determine an estimated expected rate of spread of the content.

9. The method of claim 8, wherein the estimated expected rate of spread of the content is used to determine whether spread of the content is being artificially accelerated or suppressed.

10. The method of claim 7, wherein the content comprises one or more hashtags, and wherein the numerical value is used by the computer system to determine a rating for the content.

11. The method of claim 1, wherein using the numerical value to determine one or more aspects of the particular user comprises the computer system determining whether the particular user has a fake user account.

12. The method of claim 11, wherein determining whether the particular user has a fake user account comprises evaluating growth in influence of the particular user over time relative to organic growth to determine a probability that the particular user has a fake user account.

13. The method of claim 12, wherein the probability that the particular user has a fake user account is used to determine whether the particular user is a bot.

14. The method of claim 13, wherein influence scores of multiple user accounts are evaluated, and wherein a collection of mutually linked accounts with similar influence scores are used to determine whether the multiple user accounts comprise a botnet.

15. A computer-implemented method for determining a relevance or rating score of a particular user in an electronic social network, wherein connections between users are represented by a social graph, the method implemented on a computer system comprising software and hardware, including one or more computer processors and memory, said memory including a computer-readable non-volatile memory, the method comprising:

said computer system obtaining, based on the social graph, a digital representation of a local connection structure of the particular user in the network in said computer-readable non-volatile memory of said computer system;

determining, by said computer system, a numerical value characteristic of a relevance of the particular user in the social graph; and said computer system using the numerical value to determine, in real-time, one or more aspects (i) of the particular user and/or (ii) of one or more activities or actions of the particular user in the electronic social network, wherein the numerical value is determined based on the connection structure of the particular user, and wherein the numerical value is determined based on degrees of all sets of users in the social graph reachable from the particular user using at most k connections, where k is a fixed preset positive integer number, and based on a degree determined for each enumerated set, wherein the degree of a set is determined as a number of connections connecting users inside the set to users outside, wherein the one or more activities or actions of the particular user in the electronic social network comprise the particular user posting content, and wherein the numerical value is used by the computer system to determine (i) whether the content comprises fake news and/or (ii) an estimated expected rate of spread of the content, and/or (iii) whether spread of the content is being artificially accelerated or suppressed, and/or (iv) a rating for the content.

* * * * *